United States Patent
Jiang et al.

(10) Patent No.: US 10,769,261 B2
(45) Date of Patent: Sep. 8, 2020

(54) USER IMAGE VERIFICATION

(71) Applicant: Futurewei Technologies, Inc., Plano, TX (US)

(72) Inventors: Wei Jiang, San Jose, CA (US); Wei Wang, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 295 days.

(21) Appl. No.: 15/975,282

(22) Filed: May 9, 2018

(65) Prior Publication Data

US 2019/0347388 A1  Nov. 14, 2019

(51) Int. Cl.
*G06F 21/32* (2013.01)
*G06K 9/00* (2006.01)
*G06N 3/08* (2006.01)
*H04L 29/06* (2006.01)

(52) U.S. Cl.
CPC ......... *G06F 21/32* (2013.01); *G06K 9/00268* (2013.01); *G06K 9/00288* (2013.01); *G06N 3/084* (2013.01); *H04L 63/102* (2013.01); *H04L 63/12* (2013.01)

(58) Field of Classification Search
CPC ....... G06F 21/32; H04L 63/102; H04L 63/12; G06K 9/0068; G06K 9/00288; G06N 3/084
See application file for complete search history.

(56) References Cited

U.S. PATENT DOCUMENTS

| | | | |
|---|---|---|---|
| 2016/0171346 A1* | 6/2016 | Han | G06K 9/00624 382/103 |
| 2016/0358024 A1* | 12/2016 | Krishnakumar | G06K 9/4671 |
| 2017/0083754 A1* | 3/2017 | Tang | G06K 9/00288 |
| 2017/0116311 A1* | 4/2017 | Reichman | G06F 11/1451 |
| 2017/0185871 A1* | 6/2017 | Zhang | G06N 3/084 |
| 2018/0137390 A1* | 5/2018 | Brundage | G06K 9/626 |
| 2018/0285629 A1* | 10/2018 | Son | G06K 9/6215 |
| 2018/0307986 A1* | 10/2018 | Kabul | G06N 3/04 |
| 2018/0341857 A1* | 11/2018 | Lee | G06N 3/0454 |
| 2018/0373924 A1* | 12/2018 | Yoo | G06F 21/32 |

OTHER PUBLICATIONS

Ranjan, Rajeev, et al., "HyperFace: A Deep Multi-task Learning Framework for Face Detection, Landmark Localization, Pose Estimation, and Gender Recognition", IEEE Transactions on Pattern Analysis and Machine Intelligence, (2016), 1-16.
Schroff, Florian, et al., "FaceNet: A Unified Embedding for Face Recognition and Clustering", IEEE, (2015), 815-823.
Simonyan, Karen, et al., "Very Deep Convolutional Networks for Large-Scale Image Recognition", ICLR 2015, (2015), 1-14.

* cited by examiner

*Primary Examiner* — Sher A Khan
(74) *Attorney, Agent, or Firm* — Schwegman Lundberg & Woessner, P.A.

(57) ABSTRACT

A computer-implemented method verifies an image based authentication via one or more processors performing operations including receiving image data corresponding to a face identified by a facial recognition system, processing the received raw image data via a deep neural network trained on training data that includes images of both verified and fake faces to perform a temporal facial analysis, and generating a verification signal in response to the temporal facial analysis to indicate whether the raw image data is fake.

16 Claims, 9 Drawing Sheets

USER IMAGE VERIFICATION

TECHNICAL FIELD

The present disclosure is related to user identity verification and in particular to user identity verification using image processing of user faces.

BACKGROUND

Allowing access to devices, such as smart phones and computer has long relied on passwords to identify users. The use of passwords or four-digit codes can lead to lack of robust security, as users may generally tend to use simple passwords and codes that are not difficult to determine, allowing others to access their device. Some devices with cameras have used images of a user's face to be captured and used to verify that the user is authorized to access the device.

Face recognition has become an important method for identity verification on personal devices such as smartphones, pads, robotic platforms, etc. By recognizing a 2D (two-dimensional) or 3D (three-dimensional) image of a face of a registered user, the device can grant access to the recognized user. Although current face recognition algorithms are robust enough to support such a convenient function, one potential safety issue is that the system can be fooled maliciously in several ways. For example, using a picture or a video of the registered user, an unregistered user can acquire access to the device based on the current face recognition and verification algorithms.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, computer-implemented method for verifying an image based authentication executed by one or more processors performing operations includes receiving image data corresponding to a face identified by a facial recognition system, processing the received raw image data via a neural network trained on training data that includes images of both verified and fake faces to perform a temporal facial analysis, and generating a verification signal in response to the temporal facial analysis to indicate whether the raw image data is fake.

Optionally, in any of the preceding aspects, a further implementation of the aspect includes granting access to one or more resources in response to the verification signal. Optionally, in any of the preceding aspects, a further implementation of the aspect includes wherein the raw image data comprises identified face data and features of the identified face data.

Optionally, in any of the preceding aspects, a further implementation of the aspect includes wherein the neural network comprises a first deep neural network to process the identified face data and a second, deep neural network to process the identified feature data. Optionally, in any of the preceding aspects, a further implementation of the aspect includes wherein the first and second deep neural networks generate respective first and second data cubes, and wherein the neural network further comprises a third deep neural network, the operations further comprising merging the first and second data cubes to form a merged data cube, wherein the merged data cube is processed by the third deep neural network to generate the verification signal.

Optionally, in any of the preceding aspects, a further implementation of the aspect includes wherein the first and second data cubes w×h×d (width, height, and depth) dimensional data cubes, and wherein the first and second data cubes are concatenated to form the merged data cube. Optionally, in any of the preceding aspects, a further implementation of the aspect includes wherein the neural network is trained by computing a loss, and using back propagation of the loss to update the neural network. Optionally, in any of the preceding aspects, a further implementation of the aspect includes wherein the training data comprises temporally related real and fake labeled face images.

Optionally, in any of the preceding aspects, a further implementation of the aspect includes wherein the neural network comprises deep convolutional network.

According to a further aspect of the present disclosure, a device includes a memory storage comprising instructions and one or more processors in communication with the memory storage. The one or more processors execute the instructions to perform operations to verify an image based authentication, including receiving image data corresponding to a face identified by a facial recognition system, processing the received raw image data via a deep neural network trained on training data that includes images of both verified and fake faces to perform a temporal facial analysis, and generating a verification signal in response to the temporal facial analysis to indicate whether the raw image data is fake.

Optionally, in any of the preceding aspects, a further implementation of the aspect includes granting access to the device in response to the verification signal. Optionally, in any of the preceding aspects, a further implementation of the aspect includes wherein the deep neural network is trained by computing a loss, and using back propagation of the loss to update the neural network and wherein the training data comprises temporally related real and fake labeled face images. Optionally, in any of the preceding aspects, a further implementation of the aspect includes wherein the deep neural network comprises deep convolutional network.

Optionally, in any of the preceding aspects, a further implementation of the aspect includes wherein the raw image data comprises identified face data and features of the identified face data and wherein the deep neural network comprises a first deep neural network to process the identified face data and a second, deep neural network to process the identified feature data. Optionally, in any of the preceding aspects, a further implementation of the aspect includes wherein the first and second deep neural networks generate respective first and second data cubes, and wherein the deep neural network further comprises a third deep neural network, the operations further comprising merging the first and second data cubes to form a merged data cube, wherein the merged data cube is processed by the third deep neural network to generate the verification signal, wherein the first and second data cubes w×h×d (width, height, and depth) dimensional data cubes, and wherein the first and second data cubes are concatenated to form the merged data cube.

According to a further aspect of the present disclosure, a non-transitory computer-readable media stores computer instructions for verifying an image based authentication, that when executed by one or more processors, cause the one or more processors to perform operations including receiving image data corresponding to a face identified by a facial recognition system, processing the received raw image data via a deep neural network trained on training data that includes images of both verified and fake to perform a temporal facial analysis, and generating a verification signal in response to the temporal facial analysis to indicate whether the raw image data was fake or not.

Optionally, in any of the preceding aspects, a further implementation of the aspect includes wherein the operations further comprise granting access to the device in response to the verification signal. Optionally, in any of the preceding aspects, a further implementation of the aspect includes wherein the deep neural network is trained by computing a loss, and using back propagation of the loss to update the neural network and wherein the training data comprises temporally related real and fake labeled face images.

Optionally, in any of the preceding aspects, a further implementation of the aspect includes wherein the deep neural network comprises deep convolutional network, and wherein the raw image data comprises identified face data and features of the identified face data and wherein the deep neural network comprises a first deep neural network to process the identified face data and a second, deep neural network to process the identified feature data.

Optionally, in any of the preceding aspects, a further implementation of the aspect includes wherein the first and second deep neural networks generate respective first and second data cubes, and wherein the deep neural network further comprises a third deep neural network, the operations further comprising merging the first and second data cubes to form a merged data cube, wherein the merged data cube is processed by the third deep neural network to generate the verification signal, wherein the first and second data cubes w×h×d (width, height, and depth) dimensional data cubes, and wherein the first and second data cubes are concatenated to form the merged data cube.

DETAILED DESCRIPTION

Figure 1:
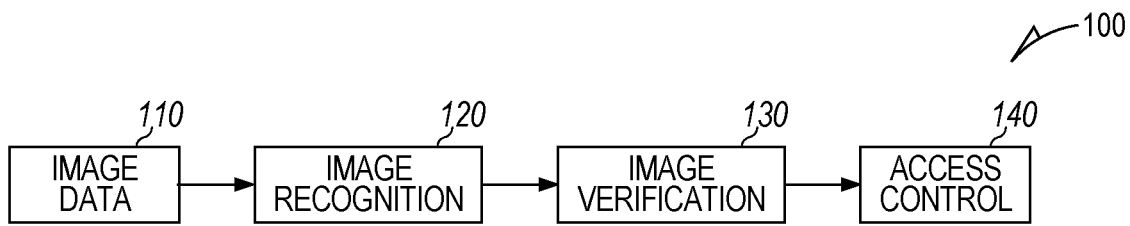
FIG. 1 is a block diagram illustrating components of an image verification system according to an example embodiment.

In the following description, reference is made to the accompanying drawings that form a part hereof, and in which is shown by way of illustration specific embodiments which may be practiced. These embodiments are described in sufficient detail to enable those skilled in the art to practice the subject matter of the application, and it is to be understood that other embodiments may be utilized and that structural, logical and electrical changes may be made without departing from the scope of the claims. The following description of example embodiments is, therefore, not to be taken in a limited sense, and has a scope defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

A face image verification method is based on temporal facial analysis through a deep neural network to verify that images of a user captured to identify a user to provide access to a device are in fact images of the actual user, and not a printed image or mask. The face verification method may be used to confirm that an image recognition based access system which captured images and recognized the images as the user, used images that were in fact captured images of the user. Such verification may be used to verify that the images were valid and that the recognition was performed on valid images, as opposed to a picture, printed image, mask, or other nefarious attempt to fool the image recognition system. Access to the device may then be granted upon successful image verification.

In various embodiments, a verification system receives input from a face detection and recognition system that positively identified a user based on multiple images of the user. Image data used to identify the user is fed to the verification system that includes a trained deep convolutional network to determine whether or not the image data is from a fake mask or picture of the user. The verification system provides an added assurance to the positive identification of the user that the identification was not fooled by a picture or mask. The verification mechanism captures subtle differences of temporal face motion between a real user and faked 2D or 3D pictures, videos, or masks that may not even be perceivable by a human viewing the images.

Besides conventional face recognition and verification, the verification system may analyze the pixel and/or feature of the user's face area, which captures the subtle difference of the temporal face motion between real valid human face and faked 2D or 3D pictures, videos, or masks. The faked identity verification by using a 2D picture or video, or a 3D printed mask can be effectively avoided.

A deep neural network may be used to detect a faked attempt at identity verification, which works as an additional verification process on top of any traditional face recognition and user verification system.

The verification system may receive images of faces that are already detected by conventional face recognition and user verification algorithms, and therefore may improve safety by posing little overhead in computation.

FIG. 1 is a block diagram illustrating components of an image verification system 100. In one embodiment, image data 110 comprising a sequence of images $I_{t-1}$, $I_t$, $I_{t+1}$, of a user attempting to gain access to a device or system are received from a camera on the device. A face detection and recognition module 120 receives the images and detects and recognizes a human face. Data from the face detection and recognition module 120 is provided to an image verification system 130. The image verification system utilizes one or more trained neural networks to determine whether or not the images are of a real person, or simply a picture or mask. If the real images are of a real user that was also recognized by the face detection and recognition module 120, an access control module 140 receives a positive indication of such from the image verification system 130 and allows access to the device.

Figure 2:
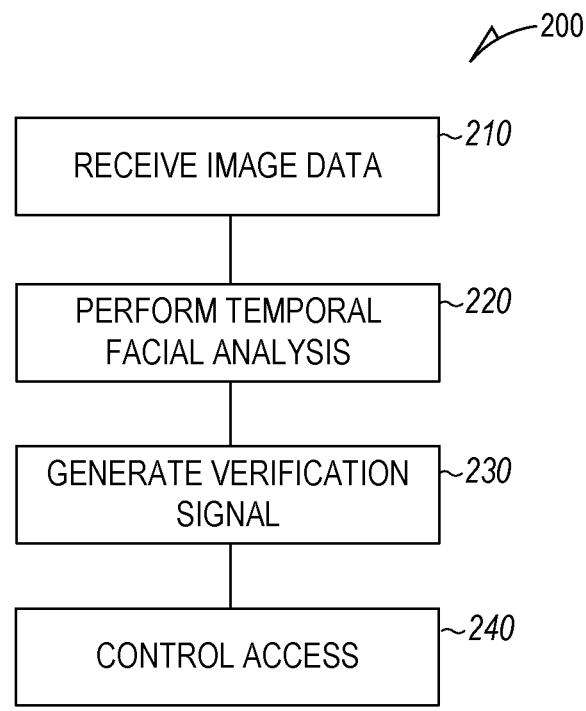
FIG. 2 is a flowchart illustrating a method of verifying that images obtained by the face detection and recognition module are in fact images of a person according to an example embodiment.

FIG. 2 is a flowchart illustrating a method of verifying that images obtained by the face detection and recognition module 120 are in fact images of a person. At operation 210, image data corresponding to a face identified by a facial recognition system is received. The received image data may include separate sets of image data, such as images of an identified face, as well as features of the face identified by the face detection and recognition module 120. At operation 220, the image verification system 130 processes the received image data via a deep neural network trained on training data that includes images of both verified and fake faces to perform a temporal facial analysis. Operation 230 generates a verification signal in response to the temporal facial analysis to indicate whether the raw image data was fake or not. Operation 240 receives the verification signal and grants or denies access to one or more resources. The resources may include a device, computing resources or service, physical area, or other access controlled resource.

Figure 3:
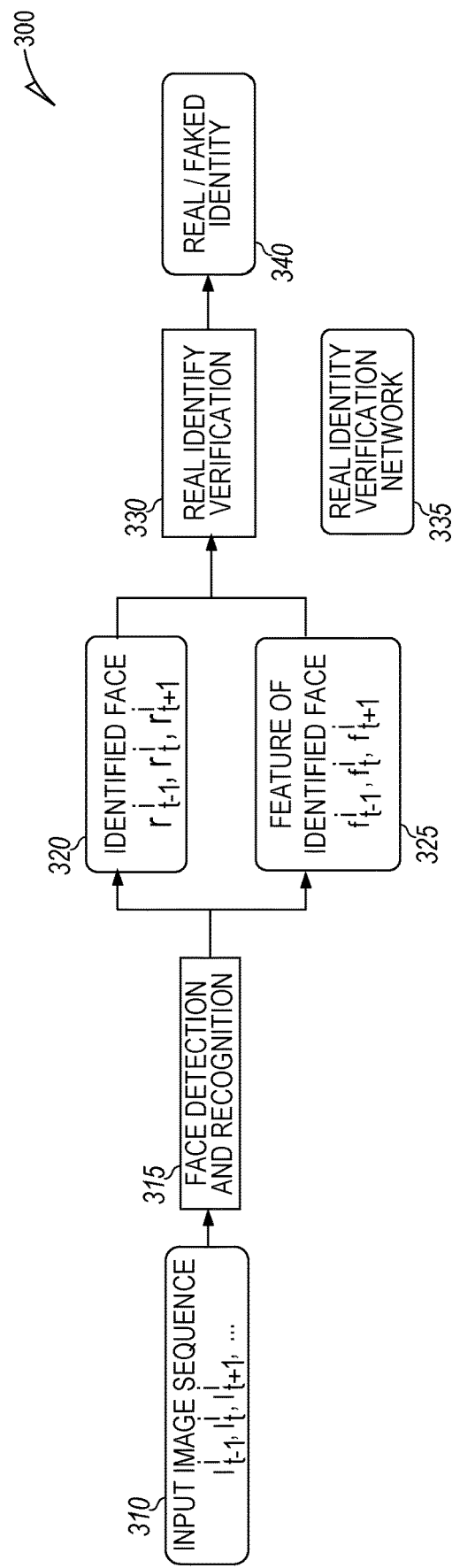
FIG. 3 is a block flow diagram of a system for controlling access based on acquired images and for testing an image verification system according to an example embodiment.

FIG. 3 is a block flow diagram of a system 300 for controlling access based on acquired images 310. System 300 may also be used to for testing the image verification system. In one embodiment, an input image sequence 310 includes images $I_{t-1}$, $I_t$, $I_{t+1}$, of a person attempting to access a resource, such as a device. The device, or a device associated with a resource to which the person is attempting to gain access, has a camera to capture the images 310. The images 310 are provided to a face detection and recognition module 315. The face detection and recognition module may be one of several currently available modules, such as the FaceNet, a unified embedding for face recognition and clustering and HyperFace, a deep multi-task learning framework for face detection, landmark localization, pose estimation, and gender recognition, that in some embodiment may be provided by network or cloud based services.

In one embodiment, the face detection and recognition module employs one or more artificial intelligence mechanisms, such as neural networks that are applied to the image sequence 310 to detect human faces $r^i_t$, i=1, ... N (320) in each image $I_t$ and at the same time determine whether each detected human face is a registered user of the device or an unknown face. A variety of face detection and recognition methods can be used. The output of the face detection and recognition module 315 is usually an aligned gray scale(?) face image $r^j_t$ 320 for each detected human face, as well as a feature representation $f^i_t$ 325 of the face. In a preferred embodiment, the feature $f_t$ is a d dimensional feature vector: $f^i_1$, $f^i_{t-1}$, $f^i_{t+1}$, ....

When a registered user is identified by the face detection and recognition module 315, a real identity verification module 330 takes as input, raw image data that includes the aligned face images $r^i_{t-1}$, $r^i_t$, $r^i_{t+1}$, ... and/or the corresponding features $f^i_{t-1}$, $f^i_t$, $f^i_{t+1}$, ... of that identified face. Each aligned face image $r^i_t$ can be an image of an identified face region of size ($w_r$, $h_r$, $c_r$). $w_r$, $h_r$, and $c_r$ are the width, height, and number of channels (c=3 for color image, and c=1 for gray image). Each feature $f^i_t$ is a data cube with size ($x_f$, $y_f$, $z_f$), which is typically the computed output of an output layer of the face detection and recognition module 315. For example, $f_t$ may be a one-dimension embedded feature of dimension $d_f$ as the final output of an embedding network or a three-dimension feature map as the output of the last convolutional layer of the embedding network such as the FaceNet.

The input is fed into a real identity verification network 335. Through forward computation throughout the real identity verification network 335, the system determines whether the identified face is a real valid face or a faked identity and provides an output 340. Since the real identity verification network 335 uses the output of the face detection and recognition module 315, the network 335 is flexible to work with any existing face detection and recognition algorithms, and also has a low computational overhead.

In addition to being able to verify that images used to detect authorized users are real, system 300 may be used as a test system to determine how well the real identity verification network 335 operates. The images 310 may comprise ground truth images. Ground truth images may be a set of labeled images that are separate from the training images, and are suitable for testing operation of a trained neural network.

Figure 4:
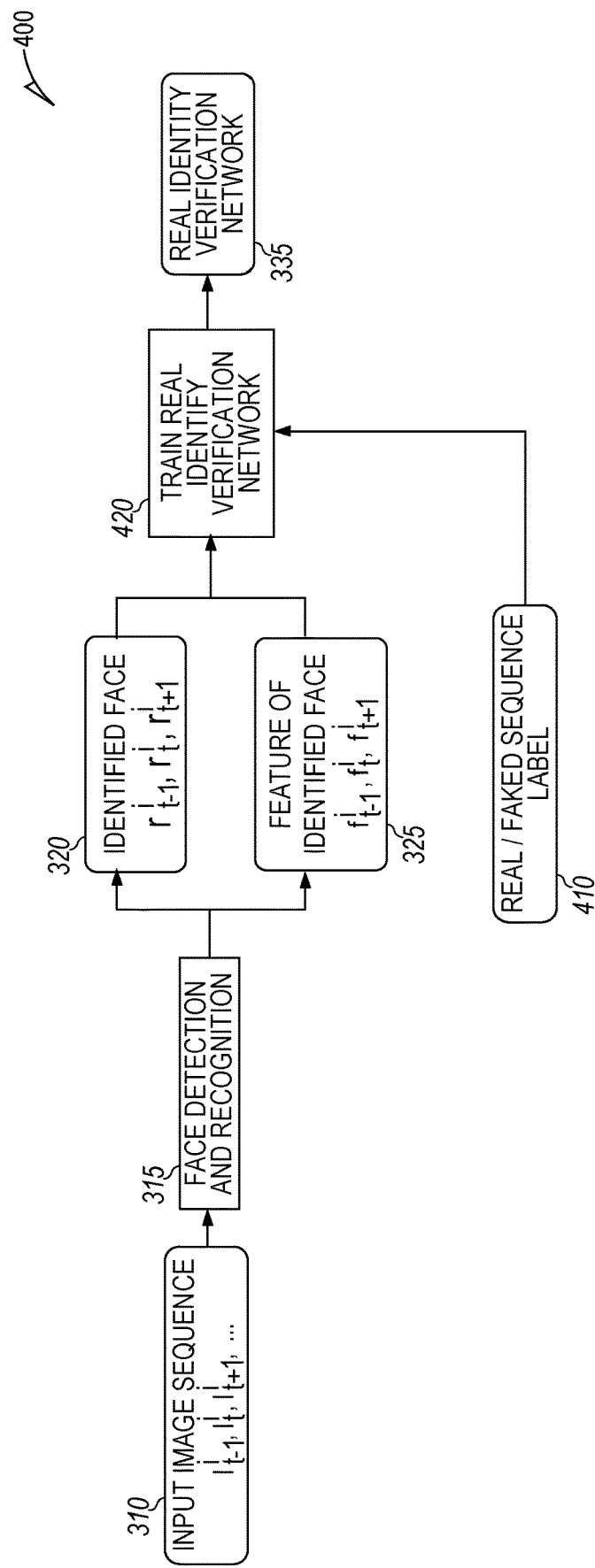
FIG. 4 is a block diagram illustrating a training stage for training the real identity verification module network according to an example embodiment.

FIG. 4 is a block diagram illustrating a training stage 400 for training the real identity verification module network 335. Reference numbers for like components and modules are consistent with FIG. 3. In one embodiment, labels 410 are provided to a real identify verification network trainer 420. The network trainer 420 receives the aligned face images 320 and features 325, as well as a label 420 indicating whether the images were real or fake.

In one embodiment, the number of image sequences 310 of the face images of training data comprise at least one sequence of face images from an actual user and at least one sequence of fake images that can be either pictures or masks of users or non-users. The number of image sequences 310 may include thousands to tens of thousands of face sequences, comprising roughly a balanced number of face images from actual users and the fake ones. For each actual user, several image sequences capturing different perspectives may be included to improve classification accuracy.

It may be better to also include several fake image sequences of the same user comprising pictures and/or masks. However, to ease the training data acquisition process, such fake image training data need not included. The training data may optionally include more than one image sequence of the same user, and the training data may optionally include a corresponding fake image sequence from the same user.

Figure 5:
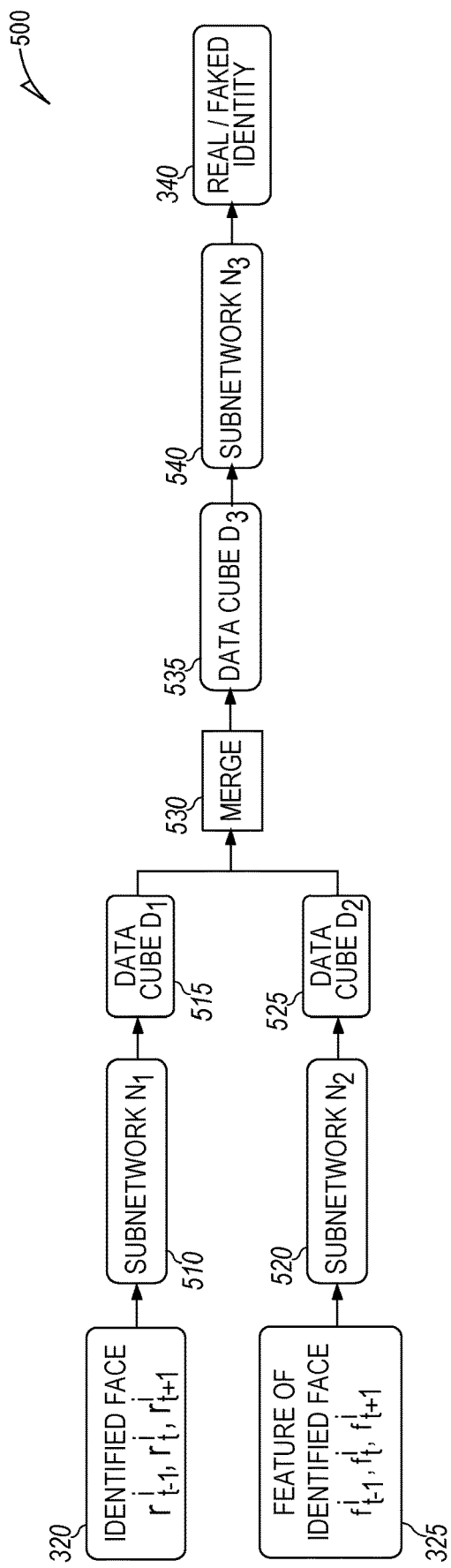
FIG. 5 is a block flow diagram illustrating one example structure of a real identity verification network according to an example embodiment.

FIG. 5 is a block flow diagram illustrating one example structure of a real identity verification network 500. Two subnetworks, $N_1$ at 510 and $N_2$ at 520 may be used to process the aligned face images $r^j_{t-1}, r^j_t, r^j_{t+1}, \ldots$ 320 and the features $f^j_t, f^j_{t-1}, f^j_{t+1}, \ldots$ 325 respectively. The two separate subnetworks $N_1$ and $N_2$ compute outputs in the form of data cubes $D_1$ and $D_2$ at 515 and 525 of size $w_1 \times h_1 \times d_1$ and $w_2 \times h_2 \times d_2$, respectively. Each entry in the data cube is typically a floating number computed feed forwardly through the subnetworks. The subnetworks $N_1$ at 510 and $N_2$ may have as many convolutional layers as feasible for available computing resources. Many existing network structures can be used here as the subnetworks, such as the ResNet (18 layers or 50 layers) are used in one embodiment.

The data cubes $D_1$ 515 and $D_2$ 525 are merged at merge function 530 to form a data cube $D_3$. Data cube $D_3$ is fed into another subnetwork $N_3$ for additional feed forward computation. In one embodiment, either subnetwork $N_1$ or $N_2$ or both may be used, combined with subnetwork $N_3$ for classification. In one embodiment, a subnetwork of the real identity verification network has a deep convolutional network structure. Any well-known deep convolutional network structures, such as VGG (a very deep convolutional network for large scale image recognition) or ResNet can be used.

The subnetwork $N_3$ may have an output 340 size of 2 for binary classification, where, after feed forward computation, the network 500 outputs two numbers, representing the probabilities of the input data being a real valid face or a faked identity, respectively. Specifically, the outputs of the subnetwork $N_1$ and $N_2$ are $w_1 \times h_1 \times d_1$ dimensional data cube $D_1$ and $w_2 \times h_2 \times d_2$ dimensional data cube $D_2$, respectively, which are merged into a $w_3 \times h_3 \times d_3$ dimensional data cube D3.

There are several ways to merge the data cubes via the merge function 530, such as concatenating the data along the depth axis when $w_1 = w_2$, $h_1 = h_2$ or flattening each data cube first into a one-dimensional vector and concatenating the vectors. Also, in one embodiment, the aligned face images $r^j_{t-1}, r^j_t, r^j_{t+1}, \ldots$ may be stacked together into an input data cube for the subnetwork $N_1$, and the features $f^j_t, f^j_{t-1}, f^j_{t+1}, \ldots$ may also be stacked together into an input data map for the subnetwork $N_2$.

Figure 6:
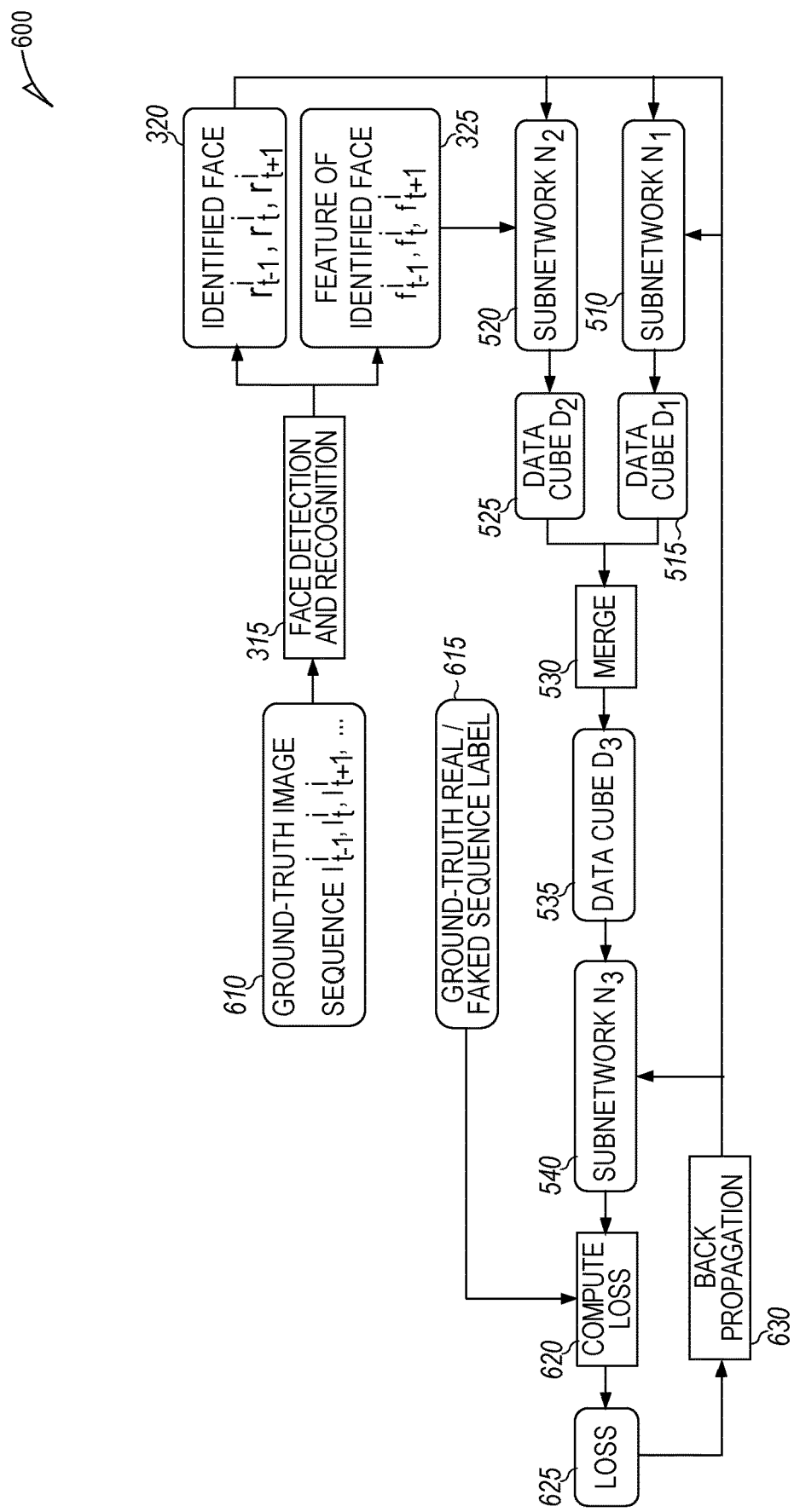
FIG. 6 is a block flow diagram illustrating an example training workflow for training a real identity verification network according to an example embodiment.

FIG. 6 is a block flow diagram illustrating an example training workflow 600 for training a real identity verification network. Given a set of ground-truth training image sequences 610 similar to the images used in the test stage, the training images are passed through the face detection and recognition module 315, which outputs the identified faces and the feature maps 320, 325 of the corresponding faces. These outputs are fed into the real identity verification network that includes elements 510, 515, 520, 525, 530, 535, and 540 for feed forward computation. The output of the real identity verification network is further fed into a compute loss module 620 to calculate a classification loss 625.

Based on the loss 625, through back propagation 630, the real identity verification network (i.e., the subnetworks $N_1$, $N_2$ and $N_3$) is updated. Many classification loss functions can be used here, such as cross-entropy loss. Many optimization methods based on back propagation can be used to update weights at nodes of the network, such as stochastic gradient descent (SGD) or Adam. The Adam optimizer is a specialized gradient-descent algorithm that uses a computed gradient, its statistics, and its historical values to take small steps in its opposite direction inside the input parameter space as a means of minimizing an objective function.

Since the real identity verification network is based on the output of the face detection and recognition algorithms, the network does not pose much computation overhead except for a feed forward computation through a deep convolutional network, which can be effectively optimized.

Further details regarding the training and operation of the subnetworks or a combination of one or more networks to perform image verification are now provided. Artificial intelligence (AI) is a field concerned with developing decision-making systems to perform cognitive tasks that have traditionally required a living actor, such as a person.

Artificial neural networks (ANNs) are computational structures that are loosely modeled on biological neurons. Generally, ANNs encode information (e.g., data or decision making) via weighted connections (e.g., synapses) between nodes (e.g., neurons). Modern ANNs are foundational to many AI applications, such as automated perception (e.g., computer vision, speech recognition, contextual awareness, etc.), automated cognition (e.g., decision-making, logistics, routing, supply chain optimization, etc.), automated control (e.g., autonomous cars, drones, robots, etc.), among others.

Many ANNs, such as subnetworks $N_1$, $N_2$, and $N_3$ are represented as matrices of weights that correspond to the modeled connections. ANNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the ANN graph. If the threshold is not exceeded then, generally, the value is not transmitted to a down-graph neuron and the synaptic connection remains inactive. The process of weighting and testing continues until an output neuron is reached; the pattern and values of the output neurons constituting the results of the ANN processing.

The correct operation of most ANNs relies on correct weights. However, ANN designers do not generally know which weights will work for a given application. Instead, a training process is used to arrive at appropriate weights. ANN designers typically choose a number of neuron layers or specific connections between layers including circular connection. A training process generally proceeds by selecting initial weights, which may be randomly selected. Training data is fed into the ANN and results are compared to an objective function, compute loss module 620, that provides an indication of error or loss 625. The error indication is a measure of how wrong the ANN's result was compared to an expected result. This error is then used to correct the weights. Over many iterations, the weights will collectively converge to encode the operational data into the ANN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value, or exhibit other undesirable behavior. Variable step sizes may be used to provide faster convergence without the downsides of large step sizes.

Backpropagation 630 is a technique whereby training data is fed forward through the ANN—here "forward" means that the data starts at the input neurons and follows the directed graph of neuron connections until the output neurons are reached—and the objective function is applied backwards through the ANN to correct the synapse weights. At each step in the backpropagation process, the result of the previous step is used to correct a weight. Thus, the result of the output neuron correction is applied to a neuron that connects to the output neuron, and so forth until the input neurons are reached.

Figure 7:
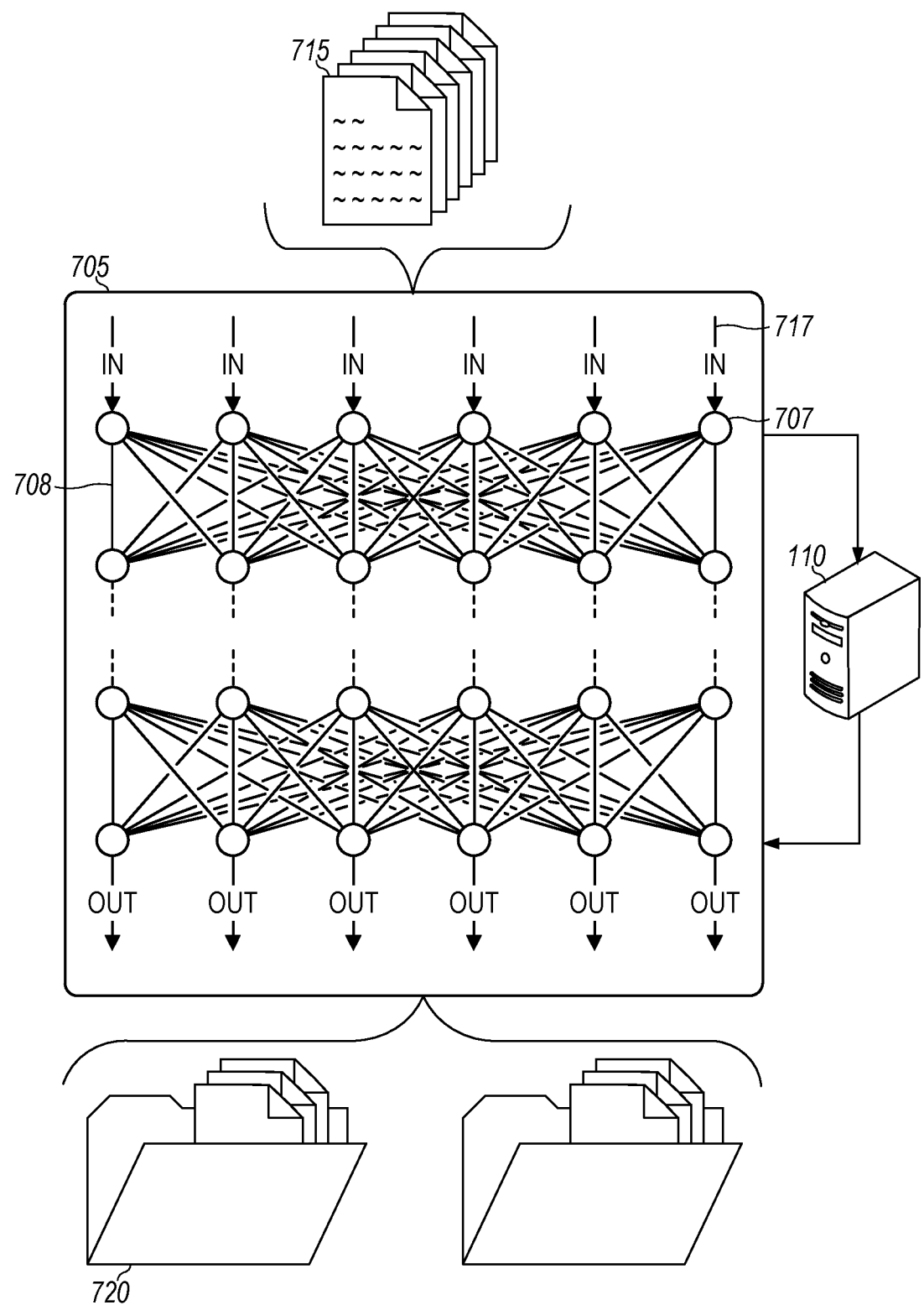
FIG. 7 is a block diagram of an example of an environment including a system for neural network training according to an example embodiment.

FIG. 7 is a block diagram of an example of an environment including a system for neural network training. The system includes an ANN 705 that is trained using a processing node 710. The processing node 710 may be a CPU, GPU, field programmable gate array (FPGA), digital signal processor (DSP), application specific integrated circuit (ASIC), or other processing circuitry. In an example, multiple processing nodes may be employed to train different layers of the ANN 705, or even different nodes 707 within layers. Thus, a set of processing nodes 710 may be arranged to perform the training of the ANN 705.

The set of processing nodes 710 is arranged to receive a training set 715 for the ANN 705. The ANN 705 comprises a set of nodes 707 arranged in layers (illustrated as rows of nodes 707) and a set of inter-node weights 708 (e.g., parameters) between nodes in the set of nodes. In an example, the training set 715 is a subset of a complete training set. Here, the subset may enable processing nodes with limited storage resources to participate in training the ANN 705.

The training data may include multiple numerical values representative of a domain, such as red, green, and blue pixel values and intensity values for an image and/or pitch and volume values at discrete times for speech recognition. Each value of the training, or input 717 to be classified once ANN 705 is trained, is provided to a corresponding node 707 in the first layer or input layer of ANN 705. The values propagate through the layers and are changed by the objective function.

As noted above, the set of processing nodes is arranged to train the neural network to create a trained neural network. Once trained, data input into the ANN will produce valid classifications 720 (e.g., the input data 717 will be assigned into categories), for example. The training performed by the set of processing nodes 707 is iterative. In an example, each iteration of the training the neural network is performed independently between layers of the ANN 705. Thus, two distinct layers may be processed in parallel by different members of the set of processing nodes. In an example, different layers of the ANN 705 are trained on different hardware. The members of different members of the set of processing nodes may be located in different packages, housings, computers, cloud based resources, etc. In an example, each iteration of the training is performed independently between nodes in the set of nodes. This example is an additional parallelization, whereby individual nodes 707 (e.g., neurons) are trained independently. In an example, the nodes are trained on different hardware.

Figure 8:
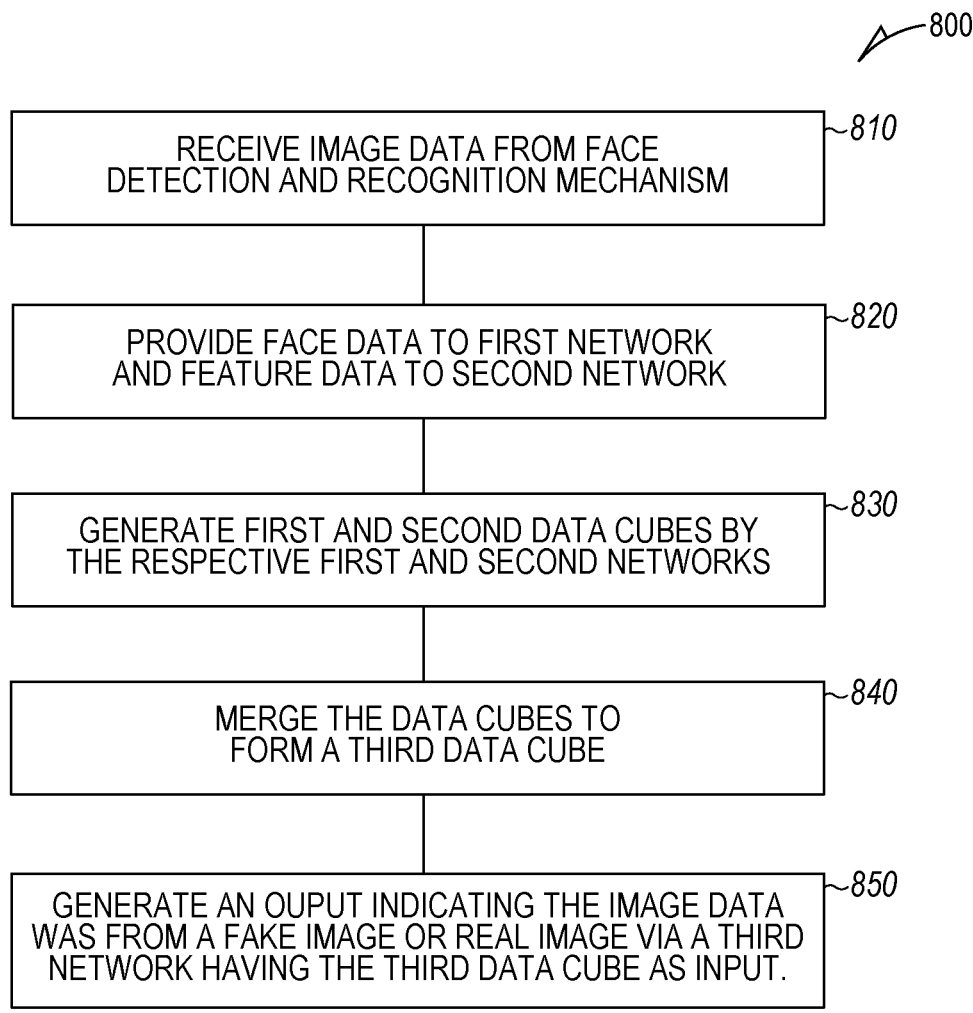
FIG. 8 is a flowchart illustrating a method of using a trained verification network according to an example embodiment.

FIG. 8 is a flowchart illustrating a method 800 of using a trained verification network. At operation 810, temporally sequential image data from a face detection and recognition system is received. The image data may be in the form of one or more of data corresponding to identified faces and/or features of the identified faces that were generated by the face detection and recognition system. At operation 820, the identified face data is provided to a first neural network and the feature data is provided to a second network.

First and second data cubes are generated by the respective first and second neural networks by operation 830. The neural networks may be deep convolutional neural networks having multiple layers trained on both labeled captured images of real faces and labeled captured fake images, such as captured images of a mask or picture. Backpropagation may be used to train the neural networks. The data cubes may include multidimensional data having a width, height, and depth.

The data cubes generated by the neural networks are merged at operation 830 to form a third data cube. The merger of the first and second data cubes may be done by simply concatenating the first and second data cubes to form the third data cube. At operation 850, a third neural network, trained in conjunction with the training of the first and second neural networks, is used to process the data from the third data cube to generate an output indicating the image data was from a fake image or real image. This output may be used to either approve or deny access to one or more resources, such as a computing device.

Figure 9:
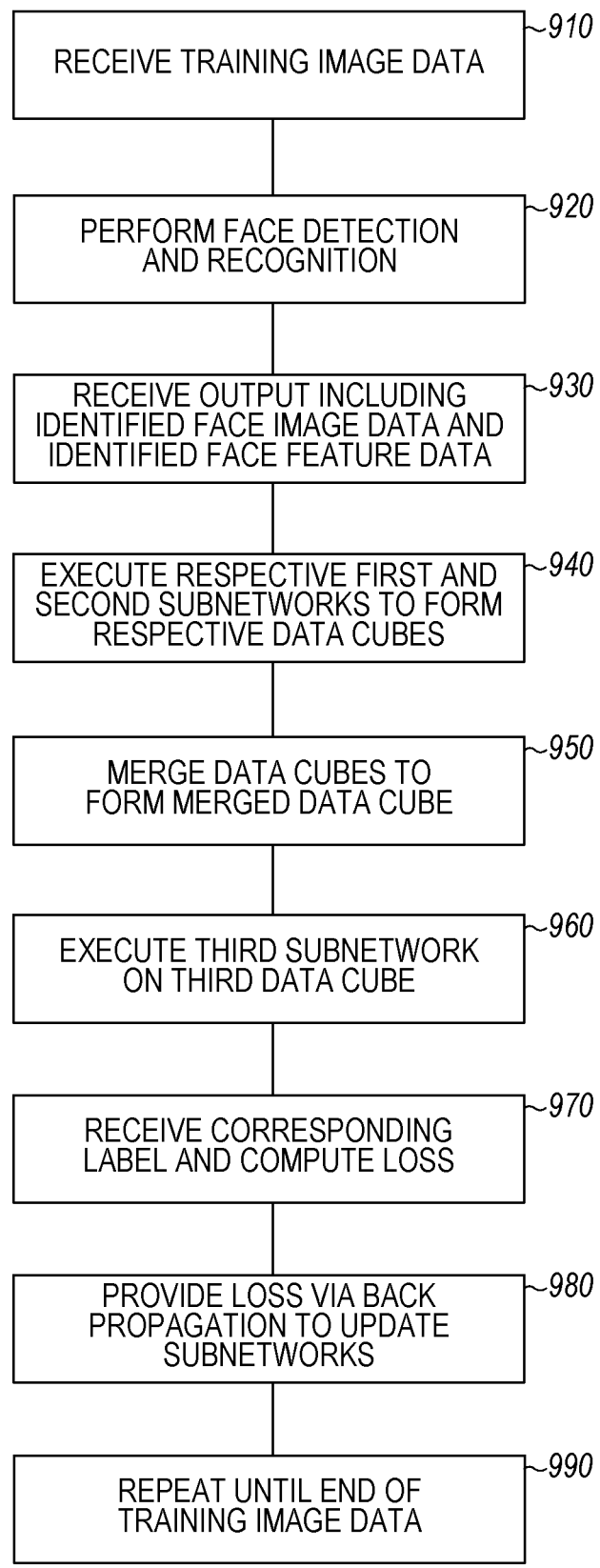
FIG. 9 is a flowchart illustrating a method of training a verification network according to an example embodiment.

FIG. 9 is a flowchart illustrating a method 900 of training a verification network. At operation 910, training image data is received. The training image data may include multiple temporal sequences of images captured by a camera associated with resources, such as a computing device, that a person wishes to access. The image data includes a label for each sequence of captured images indicating whether the captured images are of a real person, or a picture, video, or mask of a real person.

At operation 920, face detection and recognition is performed by a face detection and recognition module or system. In various embodiments, both identified face image data and identified face feature data are generated as an output. The output, including the identified face image data and the identified face feature data is received by the verification network at operation 930, which executes respective first and second subnetworks at operation 940 to form respective first and second data cubes.

The first and second data cubes are merged at operation 950 to form a third data cube, referred to as a merged data cube. Merging operation 950 may concatenate the first and second data cubes in one embodiment to form the merged data cube. A third subnetwork is executed on third data cube 960 to generate an output indicative of whether a sequence of images is real or not. That output is provided to a loss function that also receives a corresponding label of the sequence of images and computes a loss at operation 970.

At operation 980, the loss is provided via back propagation to update the subnetworks. The operations are repeated as indicated at 990 for each sequence of training data images.

Figure 10:
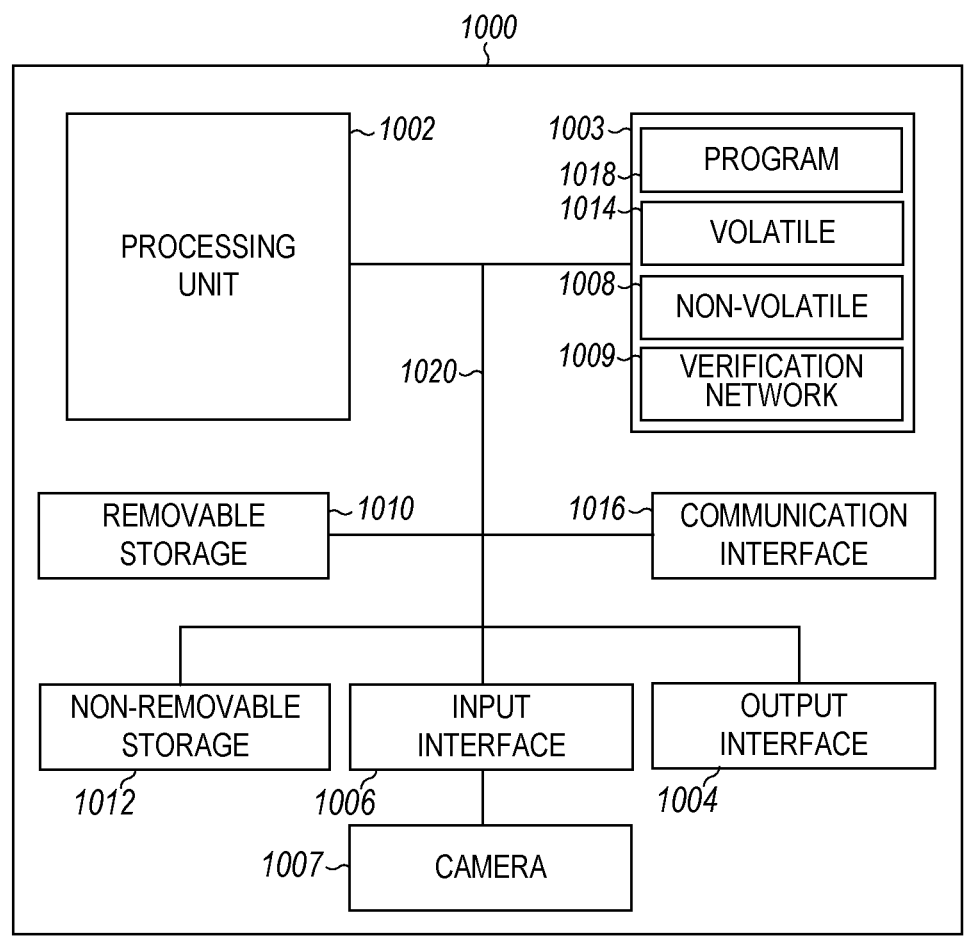
FIG. 10 is a block diagram illustrating circuitry for clients, servers, cloud based resources for implementing algorithms and performing methods according to example embodiments.

FIG. 10 is a block diagram illustrating circuitry of a device for executing an image verification network to verify whether captured images are images of a real person, or simply pictures, videos, or masks of a person. In various embodiments, the circuitry may include a camera 1007 to capture the images and also execute a face detection and identification process to determine whether a person is authorized to access the device or other resources associated with the device. The circuitry may also be used to perform other methods according to example embodiments. All components need not be used in various embodiments.

One example computing device in the form of a computer 1000 may include a processing unit 1002, memory 1003, removable storage 1010, and non-removable storage 1012. Although the example computing device is illustrated and described as computer 1000, the computing device may be in different forms in different embodiments. For example, the computing device may instead be a smartphone, a tablet, smartwatch, robotic platform, or other computing device including the same or similar elements as illustrated and described with regard to FIG. 10. The verification network may be used to verify that access should be grated to the computing device. Further, although the various data storage elements are illustrated as part of the computer 1000, the storage may also or alternatively include cloud-based storage accessible via a network, such as the Internet or server based storage.

Memory 1003 may include volatile memory 1014 and non-volatile memory 1008. Computer 1000 may include—or have access to a computing environment that includes—a variety of computer-readable media, such as volatile memory 1014 and non-volatile memory 1008, removable storage 1010 and non-removable storage 1012. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1000 may include or have access to a computing environment that includes input interface 1006, output interface 1004, and a communication interface 1016. Output interface 1004 may include a display device, such as a touchscreen, that also may serve as an input device. The input interface 1006 may include one or more of a touchscreen, touchpad, mouse, keyboard, camera 1007, one or more device-specific buttons, one or more sensors integrated within or coupled via wired or wireless data connections to the computer 1000, and other input devices. The computer may operate in a networked environment using a communication connection to connect to one or more remote computers, such as database servers. The remote computer may include a personal computer (PC), server, router, network PC, a peer device or other common DFD network switch, or the like. The communication connection may include a Local Area Network (LAN), a Wide Area Network (WAN), cellular, WiFi, Bluetooth, or other networks. According to one embodiment, the various components of computer 1000 are connected with a system bus 1020.

Computer-readable instructions stored on a computer-readable medium are executable by the processing unit 1002 of the computer 1000, such as a program 1018. The program 1018 in some embodiments comprises software that, when executed by the processing unit 1002, performs image verification operations according to any of the embodiments included herein. In some embodiments, the image verification network may be trained on a separate device or devices and loaded into memory 103 for execution.

A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 1018 may be used to cause processing unit 1002 to perform one or more methods or algorithms described herein.

EXAMPLES

In example 1, a computer-implemented method for verifying an image based authentication executed by one or more processors performing operations includes receiving image data corresponding to a face identified by a facial recognition system, processing the received raw image data via a neural network trained on training data that includes images of both verified and fake faces to perform a temporal facial analysis, and generating a verification signal in response to the temporal facial analysis to indicate whether the raw image data is fake.

Example 2 includes the computer-implemented method of example 1 and further includes granting access to one or more resources in response to the verification signal.

Example 3 includes the computer-implemented method of any of examples 1-2 wherein the raw image data comprises identified face data and features of the identified face data.

Example 4 includes the computer-implemented method of example 3 wherein the neural network comprises a first deep neural network to process the identified face data and a second, deep neural network to process the identified feature data.

Example 5 includes the computer-implemented method of example 4 wherein the first and second deep neural networks generate respective first and second data cubes, and wherein the neural network further comprises a third deep neural network, the operations further comprising merging the first and second data cubes to form a merged data cube, wherein the merged data cube is processed by the third deep neural network to generate the verification signal.

Example 6 includes the computer-implemented method of example 5 wherein the first and second data cubes w×h×d (width, height, and depth) dimensional data cubes, and wherein the first and second data cubes are concatenated to form the merged data cube.

Example 7 includes the computer-implemented method of any of examples 1-6 wherein the neural network is trained by computing a loss, and using back propagation of the loss to update the neural network.

Example 8 includes the computer-implemented method of any of examples 1-7 wherein the training data comprises temporally related real and fake labeled face images.

Example 9 includes the computer-implemented method of any of examples 1-8 wherein the neural network comprises deep convolutional network.

In example 10, a device includes a memory storage comprising instructions and one or more processors in communication with the memory storage. The one or more processors execute the instructions to perform operations to verify an image based authentication, including receiving image data corresponding to a face identified by a facial recognition system, processing the received raw image data via a deep neural network trained on training data that includes images of both verified and fake faces to perform a temporal facial analysis, and generating a verification signal in response to the temporal facial analysis to indicate whether the raw image data is fake.

Example 11 includes the device of example 10 and further comprising granting access to the device in response to the verification signal.

Example 12 includes the device of any of examples 10-11 wherein the deep neural network is trained by computing a loss, and using back propagation of the loss to update the neural network and wherein the training data comprises temporally related real and fake labeled face images.

Example 13 includes the device method of any of examples 10-12 wherein the deep neural network comprises deep convolutional network.

Example 14 includes the device of any of examples 10-13 wherein the raw image data comprises identified face data and features of the identified face data and wherein the deep neural network comprises a first deep neural network to process the identified face data and a second, deep neural network to process the identified feature data.

Example 15 includes the device of example 14 wherein the first and second deep neural networks generate respective first and second data cubes, and wherein the deep neural network further comprises a third deep neural network, the operations further comprising merging the first and second data cubes to form a merged data cube, wherein the merged data cube is processed by the third deep neural network to generate the verification signal, wherein the first and second data cubes w×h×d (width, height, and depth) dimensional data cubes, and wherein the first and second data cubes are concatenated to form the merged data cube.

In example 16, a non-transitory computer-readable media stores computer instructions for verifying an image based authentication, that when executed by one or more processors, cause the one or more processors to perform operations including receiving image data corresponding to a face identified by a facial recognition system, processing the received raw image data via a deep neural network trained on training data that includes images of both verified and fake to perform a temporal facial analysis, and generating a verification signal in response to the temporal facial analysis to indicate whether the raw image data was fake or not.

Example 17 includes the non-transitory computer-readable media of example 16 wherein the operations further comprise granting access to the device in response to the verification signal.

Example 18 includes the non-transitory computer-readable media of any of examples 16-17 wherein the deep neural network is trained by computing a loss, and using back propagation of the loss to update the neural network and wherein the training data comprises temporally related real and fake labeled face images.

Example 19 includes the non-transitory computer-readable media method of any of examples 16-18 wherein the deep neural network comprises deep convolutional network, and wherein the raw image data comprises identified face data and features of the identified face data and wherein the deep neural network comprises a first deep neural network to process the identified face data and a second, deep neural network to process the identified feature data.

Example 20 includes the non-transitory computer-readable media of example 19 wherein the first and second deep neural networks generate respective first and second data cubes, and wherein the deep neural network further comprises a third deep neural network, the operations further comprising merging the first and second data cubes to form a merged data cube, wherein the merged data cube is processed by the third deep neural network to generate the verification signal, wherein the first and second data cubes w×h×d (width, height, and depth) dimensional data cubes, and wherein the first and second data cubes are concatenated to form the merged data cube.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A computer-implemented method for verifying an image based authentication executed by one or more processors performing operations comprising:
   receiving raw image data corresponding to a face identified by a facial recognition system;
   processing the received raw image data via a neural network trained on training data that includes images of both verified and fake faces to perform a temporal facial analysis; and
   generating a verification signal in response to the temporal facial analysis to indicate whether the raw image data is fake, wherein the raw image data comprises identified face data and features of the identified face data and wherein the deep neural network comprises a first deep neural network to process the identified face data and a second, deep neural network to process the identified feature data, and wherein the first and second deep neural networks generate respective first and second data cubes, and wherein the deep neural network further comprises a third deep neural network, the operations further comprising merging the first and second data cubes to form a merged data cube, wherein the merged data cube is processed by the third deep neural network to generate the verification signal.

2. The computer-implemented method of claim 1 and further comprising granting access to one or more resources in response to the verification signal.

3. The computer-implemented method of claim 1 wherein the first and second data cubes w×h×d (width, height, and depth) dimensional data cubes, and wherein the first and second data cubes are concatenated to form the merged data cube.

4. The computer-implemented method of claim 1 wherein the neural network is trained by computing a loss, and using back propagation of the loss to update the neural network.

5. The computer-implemented method of claim 1 wherein the training data comprises temporally related real and fake labeled face images.

6. The computer-implemented method of claim 1 wherein the neural network comprises deep convolutional network.

7. A device comprising:
   a memory storage comprising instructions; and
   one or more processors in communication with the memory storage, wherein the one or more processors execute the instructions to perform operations to verify an image based authentication comprising:
   receiving raw image data corresponding to a face identified by a facial recognition system;
   processing the received raw image data via a deep neural network trained on training data that includes images of both verified and fake faces to perform a temporal facial analysis; and
   generating a verification signal in response to the temporal facial analysis to indicate whether the raw image data is fake, wherein the raw image data comprises identified face data and features of the identified face data and wherein the deep neural network comprises a first deep neural network to process the identified face data and a second, deep neural network to process the identified feature data, and wherein the first and second deep neural networks generate respective first and second data cubes, and wherein the deep neural network further comprises a third deep neural network, the operations further comprising merging the first and second data cubes to form a merged data cube, wherein the merged data cube is processed by the third deep neural network to generate the verification signal.

8. The device of claim 7 and further comprising granting access to the device in response to the verification signal.

9. The device of claim 7 wherein the deep neural network is trained by computing a loss, and using back propagation of the loss to update the neural network and wherein the training data comprises temporally related real and fake labeled face images.

10. The device method of claim 7 wherein the deep neural network comprises deep convolutional network.

11. The device of claim 7 wherein the first and second data cubes w×h×d (width, height, and depth) dimensional data cubes, and wherein the first and second data cubes are concatenated to form the merged data cube.

12. A non-transitory computer-readable media storing computer instructions for verifying an image based authentication, that when executed by one or more processors, cause the one or more processors to perform operations comprising:
  receiving raw image data corresponding to a face identified by a facial recognition system;
  processing the received raw image data via a deep neural network trained on training data that includes images of both verified and fake to perform a temporal facial analysis; and
  generating a verification signal in response to the temporal facial analysis to indicate whether the raw image data was fake or not, wherein the raw image data comprises identified face data and features of the identified face data and wherein the deep neural network comprises a first deep neural network to process the identified face data and a second, deep neural network to process the identified feature data, and wherein the first and second deep neural networks generate respective first and second data cubes, and wherein the deep neural network further comprises a third deep neural network, the operations further comprising merging the first and second data cubes to form a merged data cube, wherein the merged data cube is processed by the third deep neural network to generate the verification signal.

13. The non-transitory computer-readable media of claim 12 wherein the operations further comprise granting access to the device in response to the verification signal.

14. The non-transitory computer-readable media of claim 12 wherein the deep neural network is trained by computing a loss, and using back propagation of the loss to update the neural network and wherein the training data comprises temporally related real and fake labeled face images.

15. The non-transitory computer-readable media method of claim 12 wherein the deep neural network comprises deep convolutional network.

16. The non-transitory computer-readable media of claim 15 wherein the first and second data cubes w×h×d (width, height, and depth) dimensional data cubes, and wherein the first and second data cubes are concatenated to form the merged data cube.

* * * * *